(12) United States Patent
To

(10) Patent No.: US 9,781,631 B2
(45) Date of Patent: Oct. 3, 2017

(54) OPTIMIZING CAPACITY EXPANSION IN A MOBILE NETWORK

(71) Applicant: Affirmed Networks, Inc., Acton, MA (US)

(72) Inventor: Philip To, Burlington, MA (US)

(73) Assignee: AFFIRMED NETWORKS, INC., Acton, MA (US)

( * ) Notice: Subject to any disclaimer, the term of this patent is extended or adjusted under 35 U.S.C. 154(b) by 51 days.

(21) Appl. No.: 14/700,267

(22) Filed: Apr. 30, 2015

(65) Prior Publication Data

US 2015/0319762 A1 Nov. 5, 2015

Related U.S. Application Data

(60) Provisional application No. 61/986,462, filed on Apr. 30, 2014.

(51) Int. Cl.
*H04W 28/08* (2009.01)
*H04W 48/00* (2009.01)
*H04W 72/04* (2009.01)
*H04W 8/18* (2009.01)

(52) U.S. Cl.
CPC .......... *H04W 28/08* (2013.01); *H04W 48/17* (2013.01); *H04W 72/0486* (2013.01); *H04W 72/0493* (2013.01); *H04W 8/18* (2013.01)

(58) Field of Classification Search
None
See application file for complete search history.

(56) References Cited

U.S. PATENT DOCUMENTS 7,346,840 B1 3/2008 Ravishankar et al.
7,466,694 B2 12/2008 Xu et al.
7,734,746 B2 6/2010 Ng et al.
(Continued)

OTHER PUBLICATIONS

International Search Report and Written Opinion issued by the U.S. Patent and Trademark Office as International Searching Authority for International Application No. PCT/US2015/028496 mailed Aug. 5, 2015 (8 pages).

(Continued)

*Primary Examiner* — Charles C Jiang
*Assistant Examiner* — Saad Khawar
(74) *Attorney, Agent, or Firm* — Wilmer Cutler Pickering Hale and Dorr LLP

(57) ABSTRACT

Systems and methods of optimizing capacity of network equipment in mobile networks. A computing device receives a user identification and a user attribute, the user identification corresponding to a characteristic of the mobile network user, the user attribute corresponding to at least one characteristic of mobile network usage by the mobile network user. The computing device generates a usage prediction based on the user identification and the user attribute, the usage prediction including information corresponding to anticipated future data usage of the mobile network user, the anticipated future mobile network usage corresponding to at least one mobile resource. The computing device transmits the usage prediction to a serving gateway (SGW) such that the SGW routes the mobile network user to one of a legacy packet data network gateway (PGW) and a network function virtualization (NFV) PGW based on the usage prediction.

10 Claims, 7 Drawing Sheets

(56) References Cited

U.S. PATENT DOCUMENTS

| | | |
|---|---|---|
| 2002/0023048 A1 | 2/2002 | Buhannic et al. |
| 2004/0267758 A1 | 12/2004 | Katsurashima |
| 2005/0132051 A1 | 6/2005 | Hill et al. |
| 2005/0243726 A1 | 11/2005 | Narendran |
| 2006/0013191 A1 | 1/2006 | Kavanagh |
| 2007/0101377 A1 | 5/2007 | Six et al. |
| 2008/0077465 A1 | 3/2008 | Schimpf et al. |
| 2010/0017506 A1 | 1/2010 | Fadell |
| 2010/0035587 A1 | 2/2010 | Bennett |
| 2010/0066804 A1 | 3/2010 | Shoemake et al. |
| 2010/0188975 A1 | 7/2010 | Raleigh |
| 2013/0196617 A1 | 8/2013 | Zalmanovitch et al. |
| 2014/0141743 A1* | 5/2014 | Shaw ............... H04W 72/048 455/405 |
| 2015/0249989 A1* | 9/2015 | Aksu ............... H04W 28/0252 455/453 |

OTHER PUBLICATIONS

International Search Report and Written Opinion issued by the U.S. Patent and Trademark Office as International Searching Authority for International Application No. PCT/US2011/055183 mailed Mar. 8, 2012 (9 pages).

* cited by examiner

OPTIMIZING CAPACITY EXPANSION IN A MOBILE NETWORK

CROSS REFERENCE TO RELATED APPLICATIONS

This application claims priority to U.S. Application No. 61/986,462, entitled "Optimizing Capacity Expansion Using NFV-Based Platforms," filed Apr. 30, 2014, the contents of which is incorporated by reference in its entirety.

TECHNICAL FIELD

Embodiments of the present invention generally relate to computerized methods and apparatus for optimizing capacity expansion in a mobile network.

BACKGROUND

Traditional methods of provisioning resources in a mobile network have included adding additional physical infrastructure when a resource is at capacity. Physical equipment is designed to have fixed capacity ratios. Once a particular dimension (e.g., throughput, signaling activities, session capacity) is exhausted, a mobile network operator has no choice but to put in more equipment even though all of the other dimensions may be underutilized. This leads to increased capital and operational expenses.

SUMMARY OF THE INVENTION

In some embodiments, systems and methods are disclosed for optimizing capacity of network equipment in mobile networks. In some embodiments, a computing device receives a user identification and a user attribute, the user identification corresponding to a characteristic of the mobile network user, the user attribute corresponding to at least one characteristic of mobile network usage by the mobile network user. In some embodiments, the computing device generates a usage prediction based on the user identification and the user attribute, the usage prediction including information corresponding to anticipated future data usage of the mobile network user, the anticipated future mobile network usage corresponding to at least one mobile resource. In some embodiments, the computing device transmits the usage prediction to a serving gateway (SGW) such that the SGW routes the mobile network user to one of a legacy packet data network gateway (PGW) and a network function virtualization (NFV) PGW based on the usage prediction, the legacy PGW including a fixed capacity for the at least one mobile resource and the NFV PGW including a configurable capacity for the at least one mobile resource.

In some embodiments, the at least one characteristic of the mobile network usage of the mobile network user includes amount of prior mobile network usage, a time correlating to the mobile network usage, location of a mobile device corresponding to the mobile user, amount of time spent roaming by the mobile device, make and model of the mobile device, application installed on the mobile device, operating system and firmware version of the mobile device, subscription plan, remaining quota, and demographics information. In some embodiments, the at least one characteristic of the mobile network user includes a mobile device ID or a phone number. In some embodiments, wherein receiving the user attribute further comprises receiving the user attribute from at least one of a Home Subscriber Server (HSS), Mobility Management Entity (MME), a billing system, and a System Architecture Evolution (SAE) gateway. In some embodiments, the mobile resource comprises at least one of signaling activities, throughput, session occupancy, encryption, and transcoding.

These and other capabilities of the disclosed subject matter will be more fully understood after a review of the following figures, detailed description, and claims. It is to be understood that the phraseology and terminology employed herein are for the purpose of description and should not be regarded as limiting.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
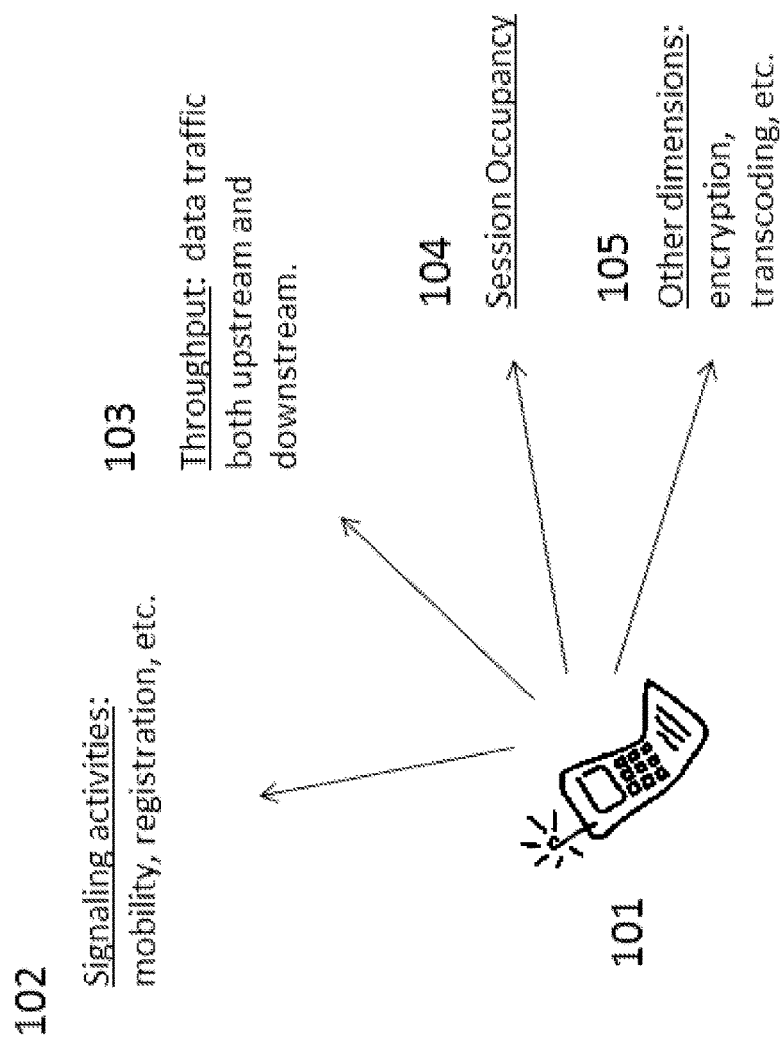
FIG. 1 is a diagram showing demands a mobile network user incurs on a mobile network, according to some embodiments of the present disclosure.

A mobile network can include mobile users with vastly different usage characteristics. For example, some mobile users are data heavy and consume large quantities of data, driving up the total amount of data throughput that the network needs to support. Other users can be very signaling heavy and make a lot of connections (e.g., using "chatty" mobile applications which send updates frequently) but transfer only small amount of data. Even though they use only a small amount of data, they drive up the amount of signaling processing required by the network. Yet some other users might be relatively idle in both data throughput and signaling dimensions (e.g., networked power meter readers), but there are many of them and just signing them onto the network takes up a lot of session capacity. To accommodate all types of users, a network operator needs to deploy enough networking equipment to cover the worst case of all these dimensions (e.g., throughput, signaling activities, session capacity, and maybe other dimensions). Since legacy networking equipment is designed with a fixed capacity ratio (supporting X number of users, Y amount of signaling and Z amount of data throughput), covering the worst case of one dimension will lead to under-utilization of the others. For example, a legacy platform deployed in the network may be hitting 100% of the session capacity but utilizing only 20% of the throughput capacity. Even though there is still excess throughput capacity, new equipment needs to be installed to increase the number users supported. This drives up both capital and operational costs.

Previously, a user base is segregated into separate applications. For example, regular consumers are separated from machine-to-machine devices. Devices can be categorized such that the devices have similar demands. Devices with similar demands can be assigned to equipment with different performance characteristics, which often comes from a different manufacturer. Even with this approach, the problem of optimizing capacity is not solved because of at least the following: (1) the broad categorization of users does not guarantee that users within a group have similar usage demands. The equipment serving a category of users can still be underutilized in some dimensions; (2) capital and operational expenditures will increase since the operators now need to potentially deal with equipment from multiple vendors, which may or may not interoperate well; (3) when the demands from different group of users change over time, the operator would need to repartition the users and reallocate the network resources which can be time consuming and costly.

Preferred embodiments of the present disclosure include using Network Function Virtualization (NFV) on platforms with different capability and cost characteristics to handle demands introduced by different types of users. Configured differently (both in terms of hardware and software), different NFV based platforms can have different strengths and weaknesses. For example, one NFV based platform can be designed so that it can house a lot of users (e.g., by using servers with a lot of memory), but with limited throughput and signaling capability. Another NFV based platform can be designed so that it can process a lot of throughput (e.g., by using specialized network adaptor cards). Yet another NFV based platform can be designed so that it can handle a lot of signaling (e.g., with a high power CPU). These NFV based platforms with different characteristics can be put together in a network to meet the different demands introduced by different types of users. To maximize the effectiveness and minimize the costs, users of different characteristics are directed to the servers with matching strength so that each server is best utilized. In this way, the strength of the legacy and NFV based platforms complement the weaknesses of one another. Network equipment can therefore be better utilized, leading to a lower overall capital and operational cost.

Preferred embodiments of the present disclosure include a function to classify and direct mobile users or subscribers to different network equipment based on past and predicted future usage characteristics to match the capacity characteristics of the network equipment. The users do not need to be segregated into different groups (e.g., separating users into different Access Point Names or APN's.) The network can appear seamless to end users and therefore there is little change in the user experience. Operators can make use of NFV to deploy platforms with different cost and performance characteristics. NFV is suitable for such applications since it allows the same network function to run on different hardware platforms. These hardware platforms range from highly sophisticated blade server chassis to low cost server boxes, which provide different performance and capacity.

In some cases, additional capability can be obtained by building a server with specialized hardware, such as a chip for hardware encryption, to support certain groups of users. Preferred embodiments of the present disclosure can be used as a green field solution (e.g., a new network made up of only NFV based platforms), or to supplement an existing legacy network which is running out of capacity. In the latter case, NFV servers can be designed to specifically relieve the bottlenecks of the legacy equipment and make the utilization of all performance dimensions more balanced. In the following, techniques are described to determine the choke point of the existing legacy platforms, to build NFV based platforms to relieve these choke points, to predict and identify the usage characteristics of the users, and to direct them to the NFV based platforms which can best handle the demands.

Preferred embodiments of the present disclosure make use of network function virtualization based platforms with different capabilities and cost characteristics to complement existing legacy equipment which has fixed capacity ratios. The legacy and NFV based platforms can work seamlessly as a single network. In some embodiments, the NFV based platforms are designed to complement the weakness of the legacy platform so that when they work together, it reduces the chance of overloading a certain capacity dimension and overall all the network nodes will be better utilized.

In some embodiments, in order to make the best use of the different capabilities of the legacy and NFV based platforms, when a user tries to access the network, the usage characteristics of the user are predicted based on a number of factors including his past usage pattern. The user is then directed to the network nodes which can best handle the user's demands.

FIG. 1 is a diagram showing demands a mobile network user incurs on a mobile network, according to some embodiments of the present disclosure. FIG. 1 shows a mobile device 101, signaling activities 102, throughput 103, session occupancy 104 and other dimensions 105.

As shown in FIG. 1, a mobile network user 101 incurs demands on the mobile network on a number of different dimensions. The user generates signaling activities 102 when registering to and deregistering from the network, when roaming around the network, etc. The user puts demands on the throughput dimension 103 when he or she is browsing web pages or sending status updates. The user also occupies one or more session spaces 104 when he or she is attached to the network. Finally, there are demands on other dimensions 105 for example if the user requires encryption or image/video transcoding services. Not all users behave the same way. A data heavy user consumes a lot of data and drives up the demand on the throughput dimension. Other users could be very signaling heavy and make lots of connections (e.g., using "chatty" apps which send a lot of updates) but transferring only small amount of data. Some users can drive up the demands on the signaling dimension in the network. Yet some other users might be relative idle in both the data throughput and the signaling dimensions (e.g., networked power meter readers), but there are many of them and just keeping them signed onto the network requires a lot of session capacity.

Network operators often have to install more network equipment to handle the aggregate demands in the different dimensions described above. Since legacy network equipment is designed to support a fixed capacity ratio (supporting X number of users, Y amount of signaling and Z amount of data throughput), covering the worst case of one dimension often leads to under-utilization of the others. For example, a network node may be hitting 100% of the session capacity but utilizing only 50% of the throughput. Even though there is still excess throughput capacity, new legacy equipment is installed to increase the number of users supported. Installing new legacy equipment can drive up both capital and operational costs.

Figure 2:
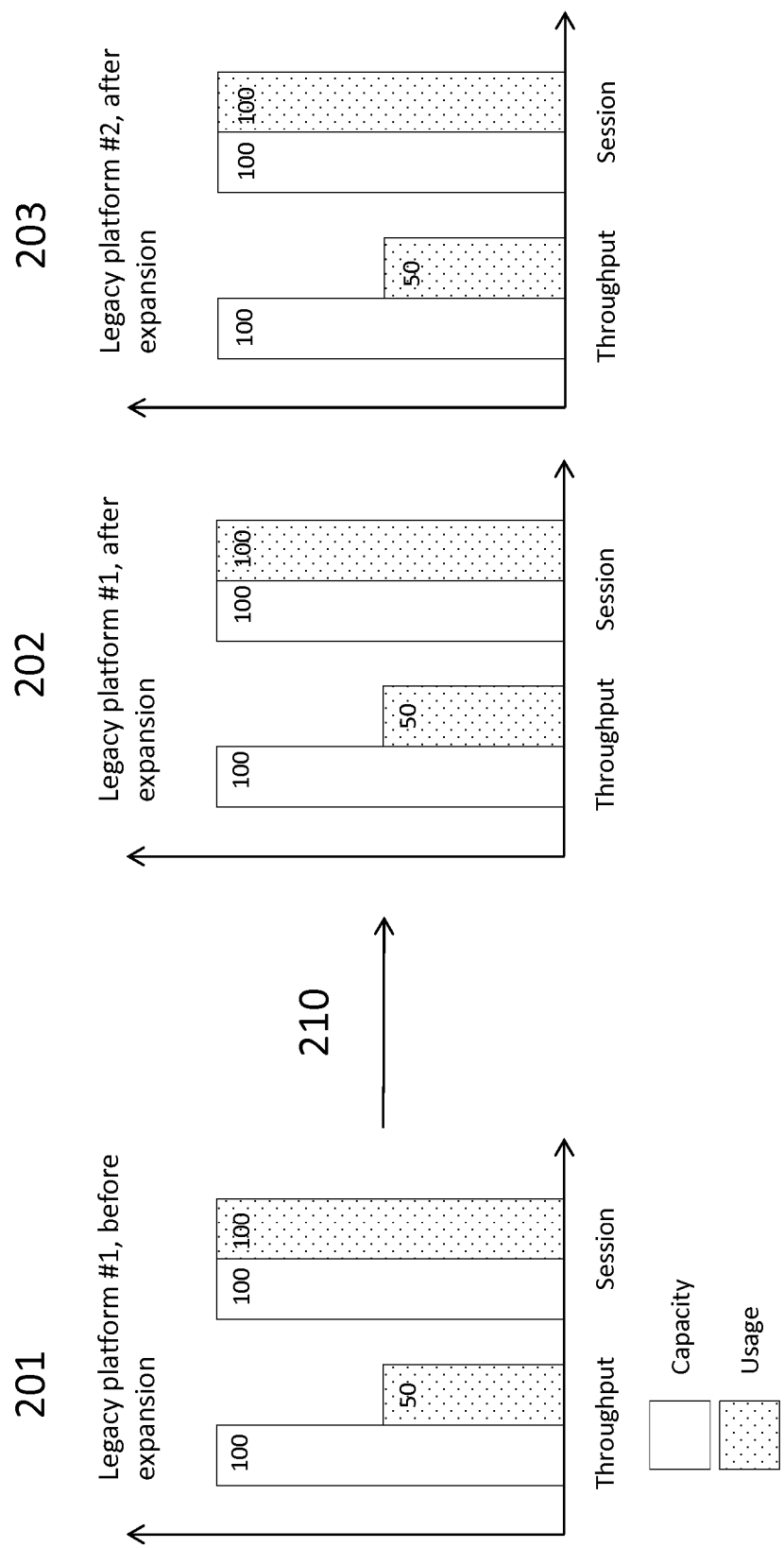
FIG. 2 is a diagram illustrating a traditional method of expansion using legacy equipment.

FIG. 2 is a diagram illustrating a traditional method of expansion using legacy equipment. FIG. 2 shows a network operator reaching maximum session capacity with a first legacy platform 201, capacity of a first legacy platform 202 after a 2× expansion 210, and capacity of a second legacy platform 203 after a 2× expansion 210.

As shown in 201, a network operator reaches maximum capacity in a first legacy platform. The first legacy platform has a maximum throughput of 100 units and a maximum of 100 sessions. 50 of the 100 units of throughput are used, while 100 of the 100 sessions are used. When the network operator anticipates a doubling of demand (e.g., 100 units of throughput and 200 sessions), the network operator has to find a way to increase capacity. To double the capacity 210, the network operator installs a second legacy platform. In some embodiments, an operator can determine the capacity usage of a platform by monitoring peak usage levels of a device (e.g., monitoring usage during busy hours). A platform can specify the maximum value for each dimension (e.g., 10 million sessions, 50 Gbps of throughput at a CPU limit such as 80%). For example, to determine an amount of session usage, an operator can use a statistic counter to see how many sessions are used during a busy hour. As another example, an operator can determine an amount of throughput by measuring the throughput at a specific CPU limit during a busy hour. An operator can determine capacity by measuring an amount of CPU usage during. In both the first legacy platform 202 and the second legacy platform 203, 50 of the 100 units of throughput are used, while 100 of the 100 sessions are used. After the expansion, both legacy platforms are still bottlenecked by the session dimension. The capacity ratio in the expanded legacy platform (e.g., equal capacity for session and throughput) does not match the demand by the users (e.g., lots of sessions but not as much throughput).

In contrast, the preferred embodiment of the present invention calls for understanding the cause for the bottleneck of existing legacy platforms, the present and future usage pattern of the users, and building NFV based platforms to complement the legacy platforms so that all capacity dimensions can be better utilized.

Figure 3:
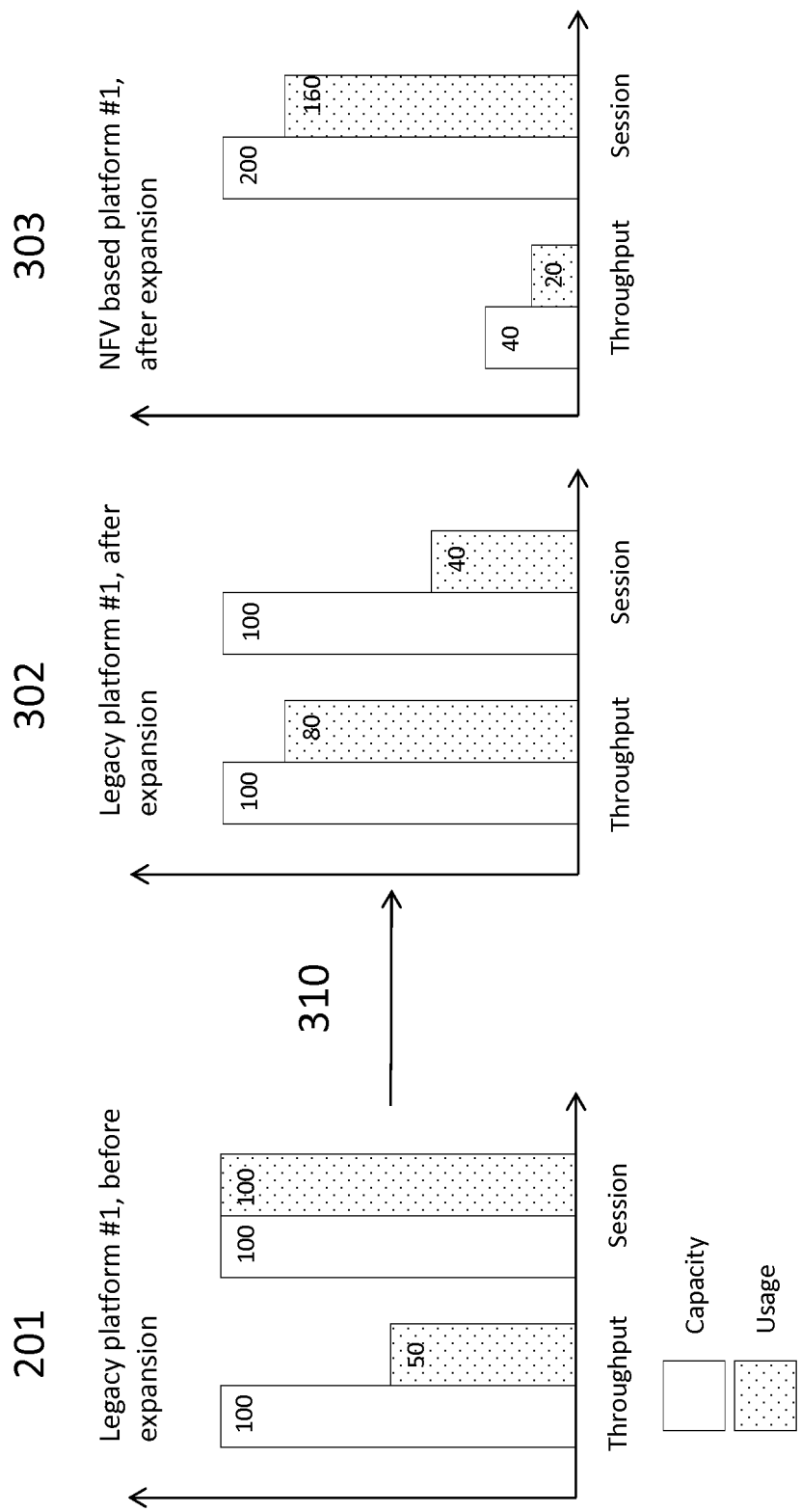
FIG. 3 is a diagram illustrating method of expansion using legacy equipment and NFV-based equipment, according to some embodiments of the present disclosure.

FIG. 3 is a diagram illustrating method of expansion using legacy equipment and NFV-based equipment, according to some embodiments of the present disclosure. FIG. 3 shows a network operator reaching a maximum session capacity with a first legacy platform 201, capacity of a first legacy platform 302 after a 2× expansion 310, and capacity of a second NFV-based platform 303 after a 2× expansion 310. While FIG. 3 illustrates expansion in two dimensions (e.g., session and throughput), a similar technique can be applied to any number of dimensions.

As described above, an operator has reached capacity in a first legacy platform with 50 of 100 units of throughput used and 100 of 100 sessions used 201. When the network operator anticipates a doubling of demand (e.g., 100 units of throughput and 200 sessions), the network operator doubles the capacity 210 by installing an NFV-based platform 303. As shown after expansion 310, the combination of the first legacy platform 302 and the NFV-based platform 303 takes into consideration the present and future usage patterns of the users. For example, if 20% of the users are using 80% of the throughput, it means that out of the 100 users:

20 heavy users are using 40 units of throughput; and
80 light users are using 10 units of throughput.

When the demand doubles, there is a total of 200 users, out of which 40 heavy users use 80 units of throughput; and
160 light users use 20 units of throughput.

An NFV-based platform can be built to support 200 users but only support 40 units of throughput, mostly likely at a fraction of the cost compared to the legacy platform. This can be done due to the flexible nature of NFV solutions—a platform can be built with a lot of memory to support more sessions, but only moderately powerful CPU for throughput processing to reduce cost. The 160 light users can be directed to the NFV based platform 303 while the heavy users can be directed to the legacy platform 302. If the legacy platform costs $1 M and the NFV platform costs $0.2 M, then the cost for doubling the capacity would be:

$2 M if only legacy platforms are used (e.g., as shown in FIG. 2); and
$1.2 M if one NFV based platform is added to the legacy platform (e.g., as shown in FIG. 3).

Using NFV-based platforms can save $0.8 M or 40% of the cost of using only legacy platforms. As described in FIGS. 2 and 3, the legacy platform has high throughput capacity but not enough session capacity. The NFV based platform complements the legacy platform by offering high session capacity but offering low throughput capacity to keep cost down. There are many different ways to build the NFV based platform to complement the legacy platforms. Operators can decide on cost and performance tradeoffs of different components such as memory, CPU, or other specialized chips, as well as how future demands will change. Using an NFV-based platform allows an operator to analyze demands from different users, build NFV-based platforms with capabilities which complement the legacy platforms, and direct the users appropriately to the different platforms to make best use of the capacity on all the platforms.

In some embodiments, the systems and methods described herein direct and classify users based on past and predicted demands. Predicting user capacity demands can help to balance capacity usage on both the legacy platform and the NFV based platforms.

Figure 4:
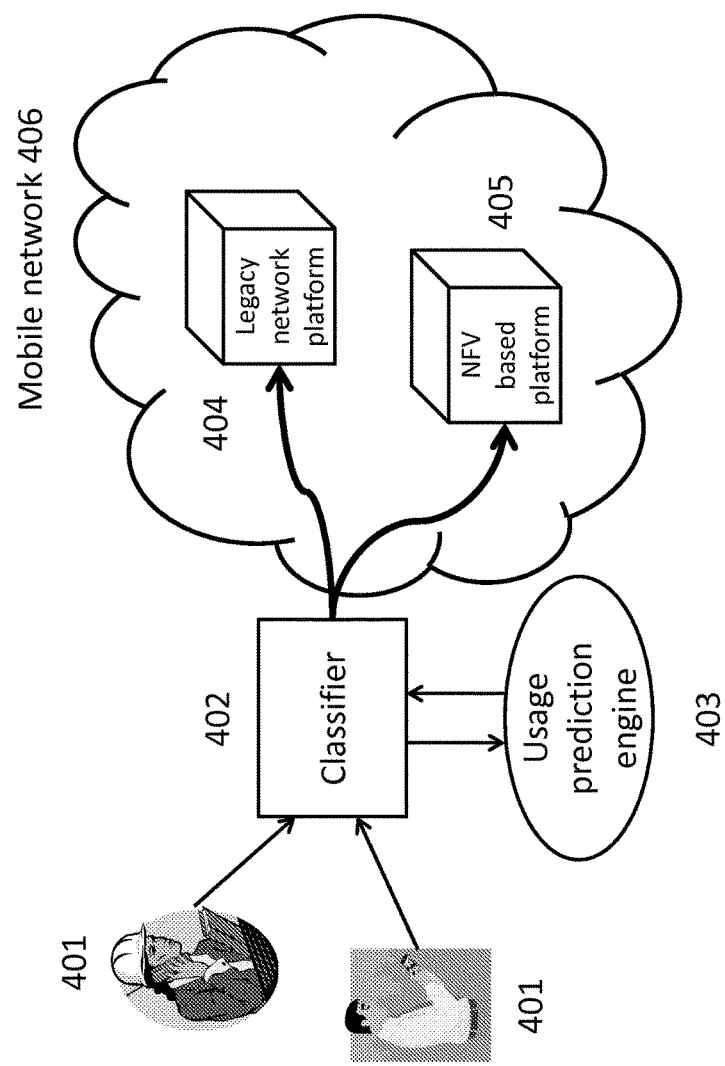
FIG. 4 is a system diagram illustrating a user in connection with a mobile network, according to some embodiments of the present disclosure.

FIG. 4 is a system diagram illustrating a user in connection with a mobile network, according to some embodiments of the present disclosure. FIG. 4 shows mobile network user 401, classifier 402, usage prediction engine 403, legacy network platform, NFV-based platform 405 and mobile network 406.

Mobile network user 401 can include mobile network subscribers who access the mobile network 406 via one or more mobile network devices (e.g., smartphones, laptops, tablets). As described in more detail below, mobile network 406 comprises a plurality of network devices. Briefly, network device in mobile network 406 can route and analyze user traffic.

As a user 401 signs onto the network 406, a classifier 402 consults usage prediction engine 403 to predict a resource usage pattern. Classifier 402 is a component which takes information from the user and his/her equipment (e.g., the Mobile equipment identifier), consults the usage prediction engine 403 and makes decision on which platform to put the user on in the mobile network 406. Classifier 402 can be implemented as a separate component, or as part of a certain network device (e.g., on the load balancer) in the mobile network. Usage prediction engine 403, which is described in more detail below, is a component that takes user identification and other attributes related to the user, and predicts the future network resource usage of the user. Based on a result from usage prediction engine 403, user 401 is directed to be serviced by legacy network platform 404 or a NFV based platform 405. As described above, classifier also receives an input from both the legacy and the NFV based platforms corresponding to their available capacity level, and their capabilities (e.g., encryption, video transcoding).

In some embodiments, a user can be directed to either a legacy platform or an NFV-based platform based on characteristics of either the user or the platform. For example, a user can be directed when the user joins a network (e.g., when the user powers up the phone in the morning). In addition, existing users can also be actively migrated from one system to another if the loading of the existing system reaches a certain threshold, or the characteristics of the user change significantly.

Figure 5:
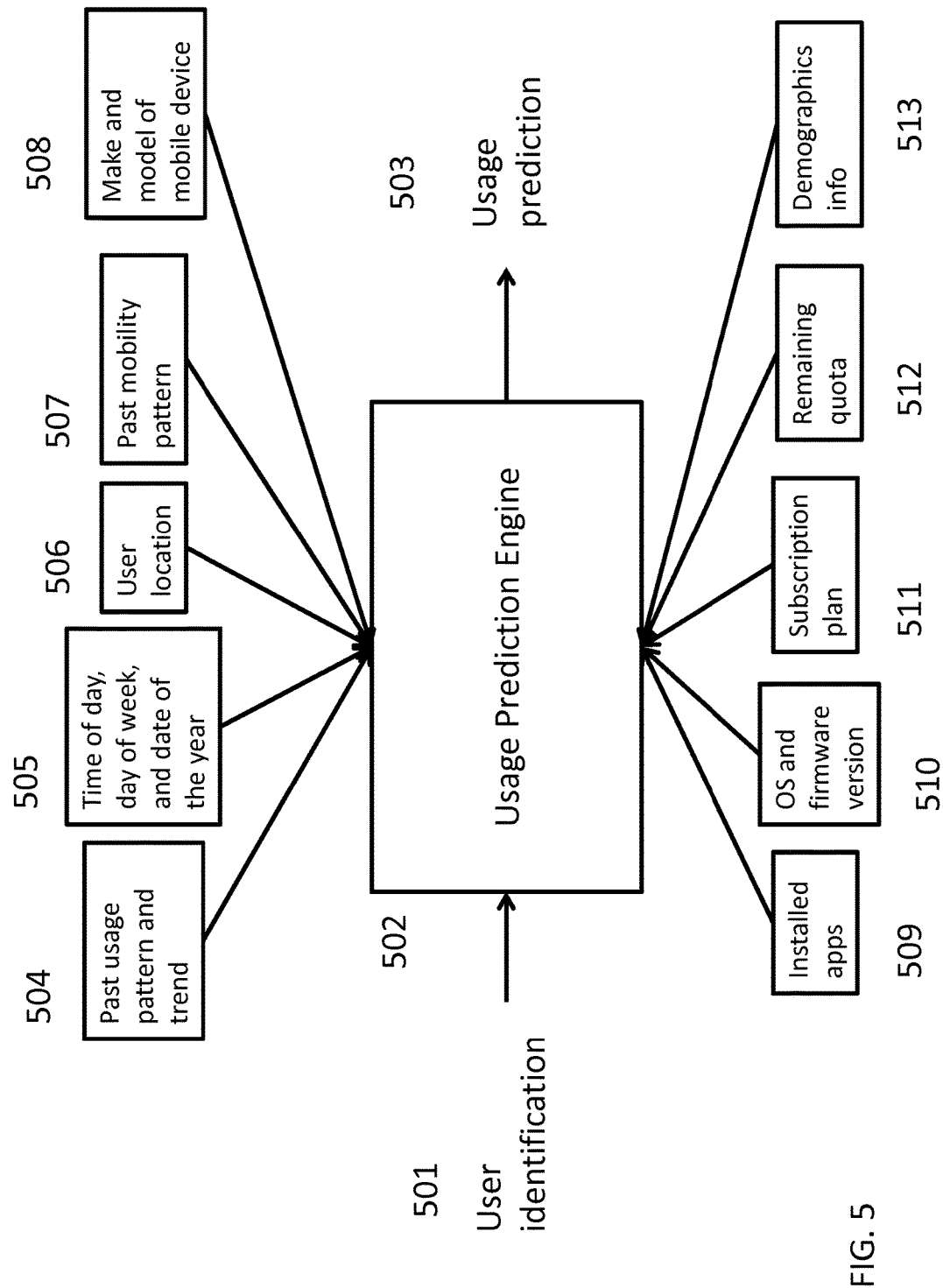
FIG. 5 is a diagram illustrating a usage prediction engine, according to some embodiments of the present disclosure.

FIG. 5 is a diagram illustrating a usage prediction engine, according to some embodiments of the present disclosure. FIG. 5 shows user identification 501, usage prediction engine 502, usage prediction 503, past usage pattern and trend 504, temporal information 505, user location 506, past mobility pattern 507, make and model of mobile device 508, installed applications 509, operating system (OS) and firmware version 510, subscription plan 511, remaining quota 512 and demographics information 513.

Usage prediction engine 502 receives user identification 501 and user attributes 504-513. As described in more detail below, user prediction engine 502 predicts future usage demands of the user 503 based on the inputs. User identification 501 corresponds to information about a user's mobile device (e.g., International Mobile Equipment Identity (IMEI)). User attributes can be collected from various components in a mobile network, as described in more detail in FIG. 6.

User attributes 504-513 include, but are not limited to:

(1) The past usage pattern and trend of the user 504—a data heavy user is likely to be data heavy in the future.

(2) Time of day, day of the week, and date of the year 505—the temporal information provides clues on what service the user uses on the mobile device. Occurrences of any mass events (e.g., Super Bowl) can also be helpful in predicting the usage pattern of the user.

(3) The location of the user 506—similar to the temporal information, the geographical location information can be helpful in predicting the usage pattern. For example, if the user is located in the city where there are more cell sites of smaller size, it is likely that the user will experience higher amount of handover events as he/she goes back and forth between cell sites. Whereas if the user is located in a suburban area, a cell site is likely to cover a larger area and the chance of handovers will be smaller.

(4) The past mobility pattern 507—a user who roams around a lot in the past will likely roam around a lot in the future.

(5) Make and model of the mobile device 508—sometimes specific types of mobile devices have vastly different resource usages. For example, a user with a touch screen phone will use more data service compare to user of a feature phone with no touch screen support.

(6) Installed mobile applications 509—some mobile apps are more "chatty" than others and trigger a lot more connections.

(7) OS and firmware version of the mobile device 510—demands can be different with different OS versions. For example, the messenger application on Apple iOS 8 supports voices and video in addition to text. That most likely translates to higher throughput usage.

(8) Subscription plan of the user 511—For example, a user with a low data cap will use less data than one with a large data cap.

(9) The remaining quota for the current billing period 512—For example, a user with a low remaining quota is likely to be more constrained in bandwidth usage than one with plenty of quota left.

(10) The demographic profile of the user 513—For example, usage behavior is likely to be drastically different between a teenager user versus and adult user. A teenager user is likely to consume more data via their social activities while an adult user may use more voice calls than data in he/her day to day activities.

Figure 6:
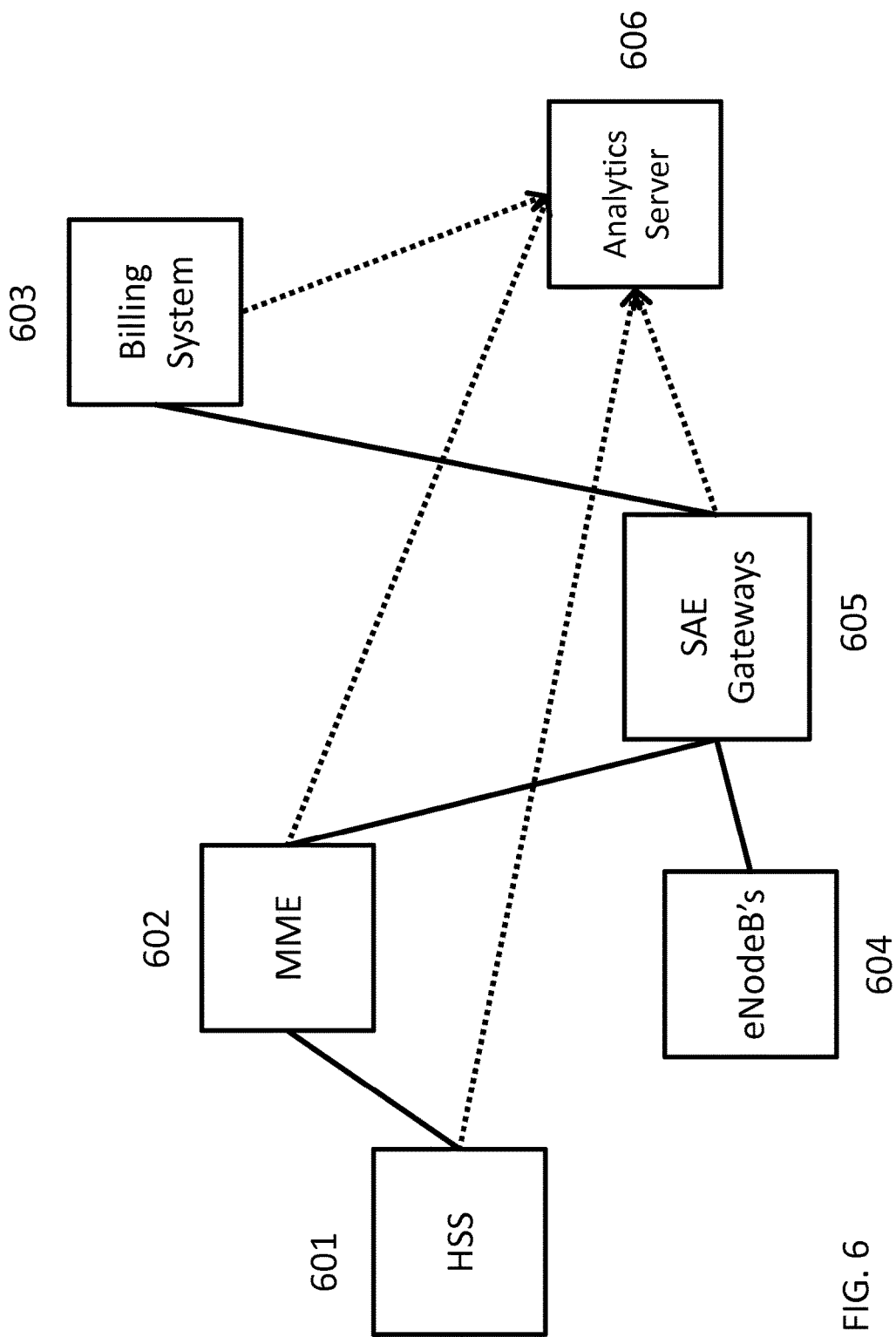
FIG. 6 is a system diagram of a mobile network, according to some embodiments of the present disclosure.

FIG. 6 is a system diagram of a mobile network, according to some embodiments of the present disclosure. FIG. 6 shows Home Subscriber Server (HSS) 601, Mobility Management Entity (MME) 602, billing system 603, eNodeB 604, System Architecture Evolution (SAE) Gateway 605, and Analytics Server 606. All of the elements shown in FIG. 6 can be either legacy or virtual.

In some embodiments, some operators may have an Analytics Server 606 to collect and analyze usage statistics about the users. This information can be fed into the prediction engine directly. In other embodiments, prediction engine contains analytic abilities of analytics server 606, and the two components are subsumed into one unit.

Home Subscriber Server (HSS) 601 contains information about the mobility of the user. Mobility information can be fed periodically into an analytics server 606 to compute the past mobility pattern of the user.

Mobility Management Entity (MME) 602 tracks a current location of a device and can send location information to analytics server 606 for further processing.

Billing system contains a subscription plan, remaining quotas, and other billing related information of the user. Billing information can be fed to the analytics server 606 for usage trend determination.

SAE gateways 605 can examine all traffic to and from the user. By using Deep Packet Inspection (DPI) techniques, usage information can be extracted from data traffic including device make and model, installed and most frequently used apps, OS and firmware version, etc. In some embodiments, DPI data is fed into the analytics server 606 for further analysis before being used by the prediction engine.

In some embodiments, usage trend of a user changes slowly over time. When usage trends change slowly, usage prediction engine does not need to update its prediction for a user in real time. For example, the prediction for a particular user can be updated once a week, and for different users a different interval can be used. In some embodiments, usage trends change more rapidly. For example, when certain events happen, the prediction can be triggered to update on demand. For example, prediction can be updated immediately if the user switched to another subscription plan or to a new phone.

When a new subscriber joins the network, there will not be much usage history to build predictions from. Initially, new users can be treated as an "average" user with average throughput and signaling loads. Alternatively, predictions can be made based on the limited amount of information available. For example, if the new subscriber is a teenager, he/she is likely to have more chatty apps such as Facebook, Instagram or Snapchat, which will incur more signaling load. If instead, the new subscriber is a business account who has signed up for tethering, he/she is likely to be a heavier data user. Prediction update frequency for new users can be higher so that the prediction can quickly converge based on newly acquired factors. At this stage, the user can be put on either the legacy system or the NFV system. Once the user is classified, it can then be moved between the legacy and the NFV systems for optimal use of network resources.

Figure 7:
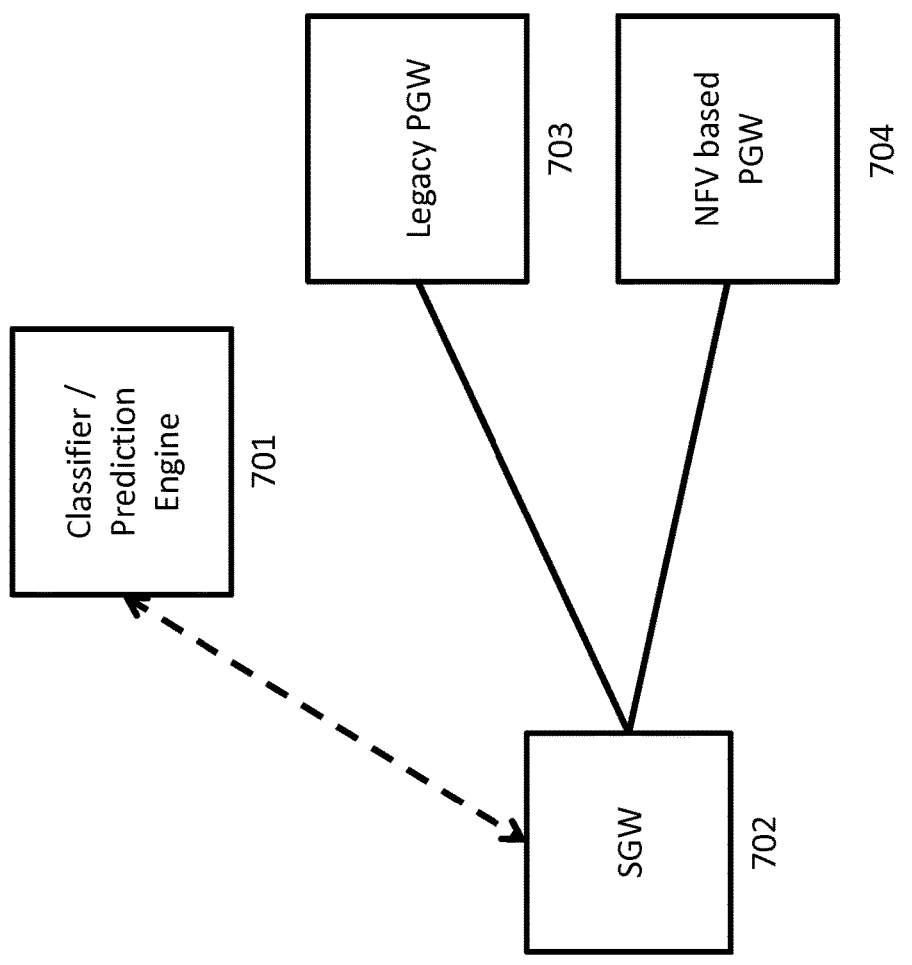
FIG. 7 is a system diagram illustrating capacity optimization in a mobile network, according to some embodiments of the present invention.

FIG. 7 is a system diagram illustrating capacity optimization in a mobile network, according to some embodiments of the present invention. FIG. 7 shows prediction engine 701, Serving Gateway (SGW) 702, Legacy Packet Data Network Gateway (PGW) 703 and NFV-based PGW 704.

When a subscriber switches on the phone, the phone will try to establish a session with the mobile network. The request will eventually be sent to SGW 701 and the SGW 701 selects a PGW 703 704 to home the user session. One of the PGW nodes includes legacy equipment 703 and the other PGW node includes an NFV-based platform 704. Normally, SGW selects a PGW based on Access Point Name (APN) only. The APN identifies the packet data network (PDN) that a mobile data user wants to communicate with, and is assigned to a user when they activate their subscription plan. In preferred embodiments, SGW consults the prediction engine to determine the best place to home the user session based on the characteristics of the user. For example, the classifier/prediction engine may provide an API based on Simple Object Access protocol (SOAP) or Representational State Transfer (REST) in which SGW can call to get a decision as to where to set up the session. Once the SGW decide to set up the session on, say, the NFV based PGW, all future signaling and data traffic related to the subscriber will be handled by the selected PGW.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

I claim:

1. A computerized method of optimizing capacity of network equipment in mobile networks, the computerized method comprising:
   receiving, by a computing device, a usage prediction based on a user identification and a user attribute, the user identification corresponding to a characteristic of a mobile network user, the user attribute corresponding to at least one characteristic of mobile network usage by the mobile network user, the usage prediction including information corresponding to anticipated future data usage of the mobile network user, the anticipated future mobile network data usage corresponding to at least one mobile resource;
   receiving, by the computing device, a capacity level from at least one of a legacy packet data network gateway (PGW) and a network function virtualization (NFV) PGW, the legacy PGW including a fixed capacity for the at least one mobile resource and the NFV PGW including a configurable capacity for the at least one mobile resource;
   determining, by the computing device, a routing decision based on the usage prediction and the capacity level, the routing decision associated with directing a serving gateway (SGW) to route the mobile network user to the at least one of the legacy PGW and the NFV PGW; and
   transmitting, by the computing device, the routing decision to the SGW.

2. The computerized method of claim 1, wherein the at least one characteristic of the mobile network usage of the mobile network user includes amount of prior mobile network usage, a time correlating to the mobile network usage, location of a mobile device corresponding to the mobile user, amount of time spent roaming by the mobile device, make and model of the mobile device, application installed on the mobile device, operating system and firmware version of the mobile device, subscription plan, remaining quota, and demographics information.

3. The computerized method of claim 1, wherein the at least one characteristic of the mobile network user includes a mobile device ID or a phone number.

4. The computerized method of claim 1, wherein receiving the user attribute further comprises receiving the user attribute from at least one of a Home Subscriber Server (HSS), Mobility Management Entity (MME), a billing system, and a System Architecture Evolution (SAE) gateway.

5. The computerized method of claim 1, wherein the mobile resource comprises at least one of signaling activities, throughput, session occupancy, encryption, and transcoding.

6. A system for optimizing capacity of network equipment in mobile networks, the system comprising:
   a processor; and
   a memory coupled to the processor and including computer-readable instructions that, when executed by a processor, cause the processor to:
      receive a usage prediction based on a user identification and a user attribute, the user identification corresponding to a characteristic of a mobile network user, the user attribute corresponding to at least one characteristic of mobile network usage by the mobile network user, the usage prediction including information corresponding to anticipated future data usage of the mobile network user, the anticipated future mobile network data usage corresponding to at least one mobile resource;
      receive a capacity level from at least one of a legacy packet data network gateway (PGW) and a network function virtualization (NFV) PGW, the legacy PGW including a fixed capacity for the at least one mobile resource and the NFV PGW including a configurable capacity for the at least one mobile resource;
      determine a routing decision based on the usage prediction and the capacity level, the routing decision associated with directing a serving gateway (SGW) to route the mobile network user to the at least one of the legacy PGW and the NFV PGW; and
      transmit the routing decision to the SGW.

7. The system of claim 6, wherein the at least one characteristic of the mobile network usage of the mobile network user includes amount of prior mobile network usage, a time correlating to the mobile network usage, location of a mobile device corresponding to the mobile user, amount of time spent roaming by the mobile device, make and model of the mobile device, application installed on the mobile device, operating system and firmware version of the mobile device, subscription plan, remaining quota, and demographics information.

8. The system of claim 6, wherein the at least one characteristic of the mobile network user includes a mobile device ID or a phone number.

9. The system of claim 6, wherein the processor is further caused to receive the user attribute from at least one of a Home Subscriber Server (HSS), Mobility Management Entity (MME), a billing system, and a System Architecture Evolution (SAE) gateway.

10. The system of claim 6, wherein the mobile resource comprises at least one of signaling activities, throughput, session occupancy, encryption, and transcoding.

* * * * *